(12) United States Patent
Bleier

(10) Patent No.: US 6,786,608 B1
(45) Date of Patent: Sep. 7, 2004

(54) VIBRATION AND SHOCK ABSORBING MOUNTING ASSEMBLY FOR A RETROREFLECTOR ASSEMBLY

(75) Inventor: Zvi Bleier, Centerport, NY (US)

(73) Assignee: PLX, Inc., Deer Park, NY (US)

( * ) Notice: Subject to any disclaimer, the term of this patent is extended or adjusted under 35 U.S.C. 154(b) by 61 days.

(21) Appl. No.: 10/334,163

(22) Filed: Dec. 30, 2002

(51) Int. Cl.[7] .................................................. G02B 5/12
(52) U.S. Cl. ...................................... 359/515; 359/530
(58) Field of Search ................................. 359/515, 516, 359/520, 529, 530, 546, 871, 872

(56) References Cited

U.S. PATENT DOCUMENTS

| | | | |
|---|---|---|---|
| 5,031,170 A | * | 7/1991 | Endoh ......................... 369/247 |
| 5,122,901 A | | 6/1992 | Bleier |
| 5,335,111 A | | 8/1994 | Bleier |

* cited by examiner

Primary Examiner—Euncha P. Cherry

(74) *Attorney, Agent, or Firm*—Kaplan & Gilman, LLP

(57) ABSTRACT

A flexible mounting assembly is provided for a retroreflector assembly. The mounting assembly has a base member comprising three radial arms situated at substantially 120° from each other. In a preferred embodiment, a connector is mounted to the end of each arm, with the connector connecting the arm of the base to a resilient support member. Each support member has a pair of co-planar receiving surfaces, for receipt thereon of a mounting block, which mounting block is adhered to the underside of the retroreflector. The co-planar receiving surfaces of each of the support members are separated by a notch in the structure of the support member. In other embodiments, the radial arms of the mounting member and the connectors can be uniformly formed members. Another embodiment could have the mounting blocks an integrally formed part of the support members; i.e., integrally extending out from the co-planar surfaces. In yet further embodiments, the mounting blocks could be a pair of mounting blocks for each support member, instead of a single mounting block that spans the notch under and between the co-planar receiving surfaces. Finally, the base member has a threaded bore extending therein for receipt of a correspondingly threaded member extending from a support structure to allow for easy, removable, yet secure, attachment of the assembly.

33 Claims, 3 Drawing Sheets

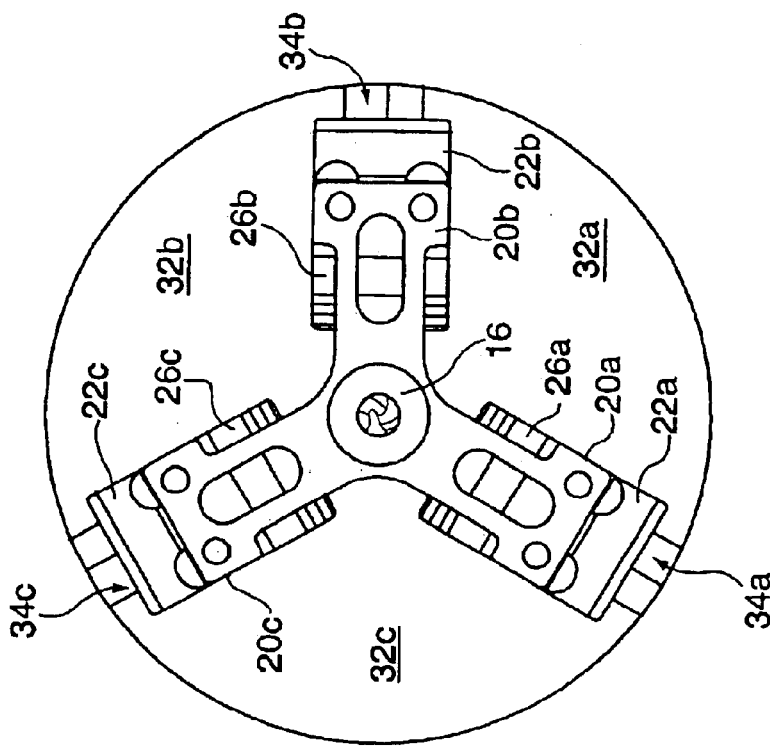
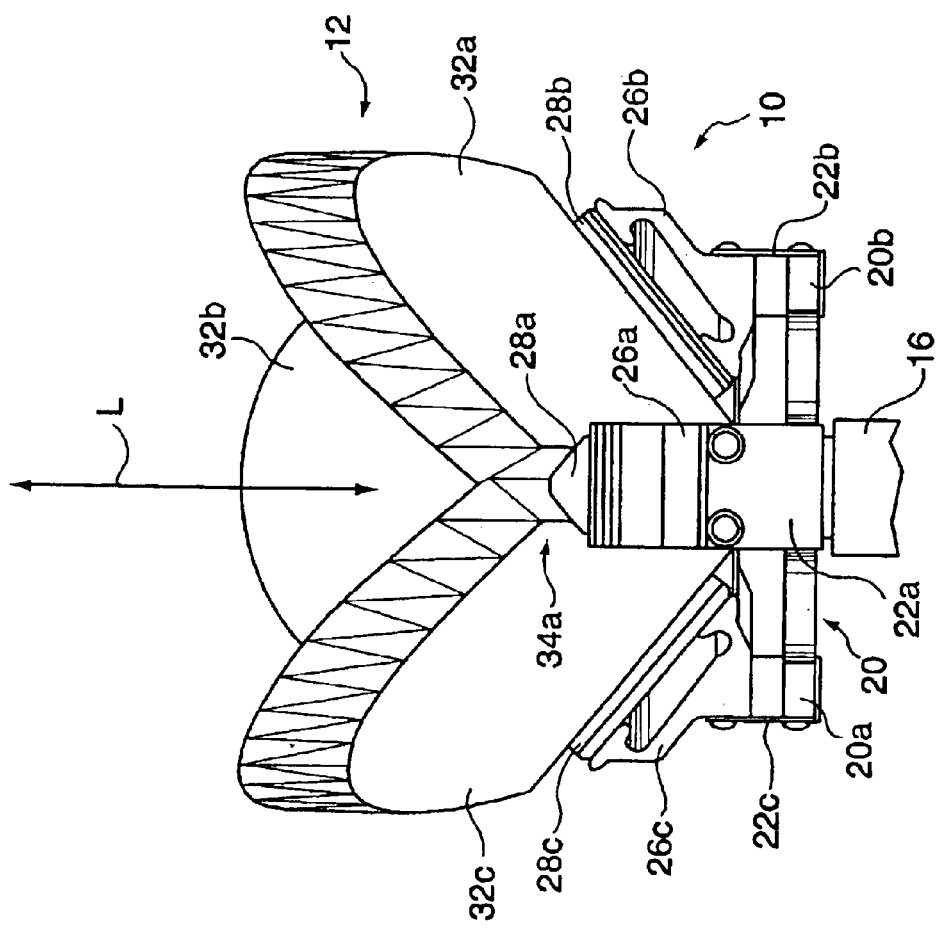
Fig. 2
Fig. 1

VIBRATION AND SHOCK ABSORBING MOUNTING ASSEMBLY FOR A RETROREFLECTOR ASSEMBLY

BACKGROUND OF THE INVENTION

This invention relates to the field of retroreflectors, and more particularly, to a retroreflector assembly mounted on a flexible, vibration and shock absorbing mounting assembly.

Retroreflectors are old in the art. Corner cube retroreflectors are made of three plates joined together having optically flat reflective surfaces disposed at right angles to each other, and meeting at what can be described as a common inside corner of an imaginary cube. Retroreflectors in general have the essential property of causing incident and reflected light rays to travel along parallel paths.

When corner cube retroreflectors are assembled for high accuracy and precision it is always essential to ensure that the reflective surfaces remain mutually perpendicular. This is especially difficult when the retroreflector is used in applications where large vibrational stresses are applied to the structure of the retroreflector. In these situations, it is not uncommon for the structural components of the retroreflector to become loose from each other, thereby changing the orientational alignment of its components and hence reducing the accuracy of the retroreflector.

Accordingly, in addition to the normal effects on the perpendicularity of the reflective surfaces by external stresses such as thermal expansion or contraction of the substrate material from which the retroreflector is made, and/or deflection caused by curing of the adhesives which join members of the retroreflector and/or mass, it has been determined that vibrations translated into the body of the retroreflector will cause the retroreflector to rapidly deteriorate in its integral construction thereby requiring replacement of this expensive unit. Accordingly, it would be desirable to mount a retroreflector in such a manner as to reduce these vibrational stresses. Further, it would be desirable to be able to mount a retroreflector in such a manor that bending is only allowed in the mount in the axial direction, and not rotationally or radially, as radial or rotational movements can effect beam path location, while axial movement does not. Examples of corner cube retroreflector mounting assemblies that have proven successful in maintaining the reflective surfaces in their perpendicular orientations, but have done nothing to reduce vibrational stresses from traveling into the structure of the retroreflector, are:

U.S. Pat. No. 3,977,765, to Lipkins, which discloses a corner cube retroreflector mounted to a support structure through means of applying an adhesive into the joints formed between joined members of the retroreflector and a flat surface of the support structure. This method of mounting the retroreflector ensures that the stresses associated with the curing of the adhesive are primarily translated along the reflective surfaces, not in such a manner as to cause deflection of those surfaces.

U.S. Pat. No. 5,122,901, to Bleier, which discloses a surveying retroreflector assembly having a corner cube retroreflector mounted within a receptacle. The receptacle has a conically configured interior for receiving the retroreflector and for maintaining the perpendicular alignment of the reflective surfaces of the plates of the retroreflector. The receptacle is then received within an outer casing to allow for mounting of the entire assembly.

U.S. Pat. No. 5,335,111, to Bleier, which discloses a corner cube retroreflector assembly with a hard mount assembly. Through this structure, the retroreflector is adhered to a mounting member in such a way that the reflective surfaces of the retroreflector are not subject to distortional deflections due to common stresses such as those due to thermal expansion/contraction, curing or mass. This mounting method also reduced movement of the retroreflector and allowed for easy and secure mounting of the retroreflector to a support.

SUMMARY OF THE INVENTION

In accordance with the invention, a flexible mount assembly is provided for a corner cube retroreflector assembly. The mounting assembly of the invention receives a retroreflector in such a way as to reduce deflection of the reflective surfaces of the retroreflector due to stresses from vibration or jolts to the structure and in such a way as to prevent radial and/or rotational bending/movement of the retroreflector from the vibrations, so that beam path variations are prevented. The mounting assembly also allows for easy and secure mounting of the retroreflector to a support.

The corner cube retroreflector usually has three plates having optically flat reflective surfaces disposed at right angles to each other and non-reflective surfaces opposite to the reflective surfaces of the plates. Each of the plates also has first and second sides disposed at right angles to each other, the first side of each plate abutting and being adhered to the reflective surface of the plate adjacent to it.

The mounting member has a base member comprising three radial arms situated at substantially 120° from each other. In a preferred embodiment, a connector is mounted to the end of each arm, with the connector connecting the arm of the base to a resilient support member. Each support member has a pair of co-planar receiving surfaces, for receipt thereon of a mounting block, which mounting block is adhered to the underside (non-reflective side) of the retroreflector in the groove formed between the joined plates. The co-planar receiving surfaces of each of the support members are separated by a notch in the structure of the support member. In substantial part, it is the formation of the notch that allows the support member to be resilient (i.e., flexible when under vibrational stresses) in the axial direction.

In other embodiments, the radial arms of the mounting member and the connectors can be uniformly formed members. In this way, out of the end of each arm there would integrally extend the connectors. Another embodiment could have the mounting blocks an integrally formed part of the support members; i.e., integrally extending out from the co-planar surfaces. In yet further embodiments, the mounting blocks could be a pair of mounting blocks for each support member, instead of a single mounting block that spans the notch under and between the co-planar receiving surfaces. Under any of these constructions, the manner of the mounting of the retroreflector to the mounting member ensures rotational and radial rigidity, while only allowing for axial bending/movement of the retroreflector. Hence beam and path location is not effected.

The base member of the mounting member also has a threaded bore extending therein for receipt of a correspondingly threaded member extending from a support structure. In the alternative, the base member could have the male, threaded extending member, while the support structure has the receiving female threaded bore. This system ensures easy and secure mounting to any support structure.

Accordingly, it is an object of the invention to provide an improved vibration and shock absorbing mounting assembly for a corner cube retroreflector assembly.

Another object of the invention is to provide an improved vibration and shock absorbing mounting assembly for a corner cube retroreflector assembly which causes minimal external stresses to the reflective surfaces of the retroreflector from the mounting.

Still another object of the invention is to provide an improved vibration and shock absorbing mounting assembly for a corner cube retroreflector assembly wherein the assembly achieves significant reductions in rotational and radial movement of the assembly in order to achieve high-accuracy measurements, even under extreme vibrational stresses.

Yet a further object of the invention is to provide an improved vibration and shock absorbing mounting assembly for a corner cube retroreflector assembly wherein the mounting of the entire assembly to a support structure is easy and secure.

Other objects of the invention will in part be obvious and will in part be apparent from the following description.

The invention accordingly comprises an assembly possessing the features, properties and relation of components which will be exemplified in the constructions hereinafter described, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 1 is a side elevation view of a first embodiment of the invention;

FIG. 2 is a bottom plan view of the assembly of FIG. 1;

DETAILED DESCRIPTION OF THE PREFERRED EMBODIMENTS

Figure 3A:
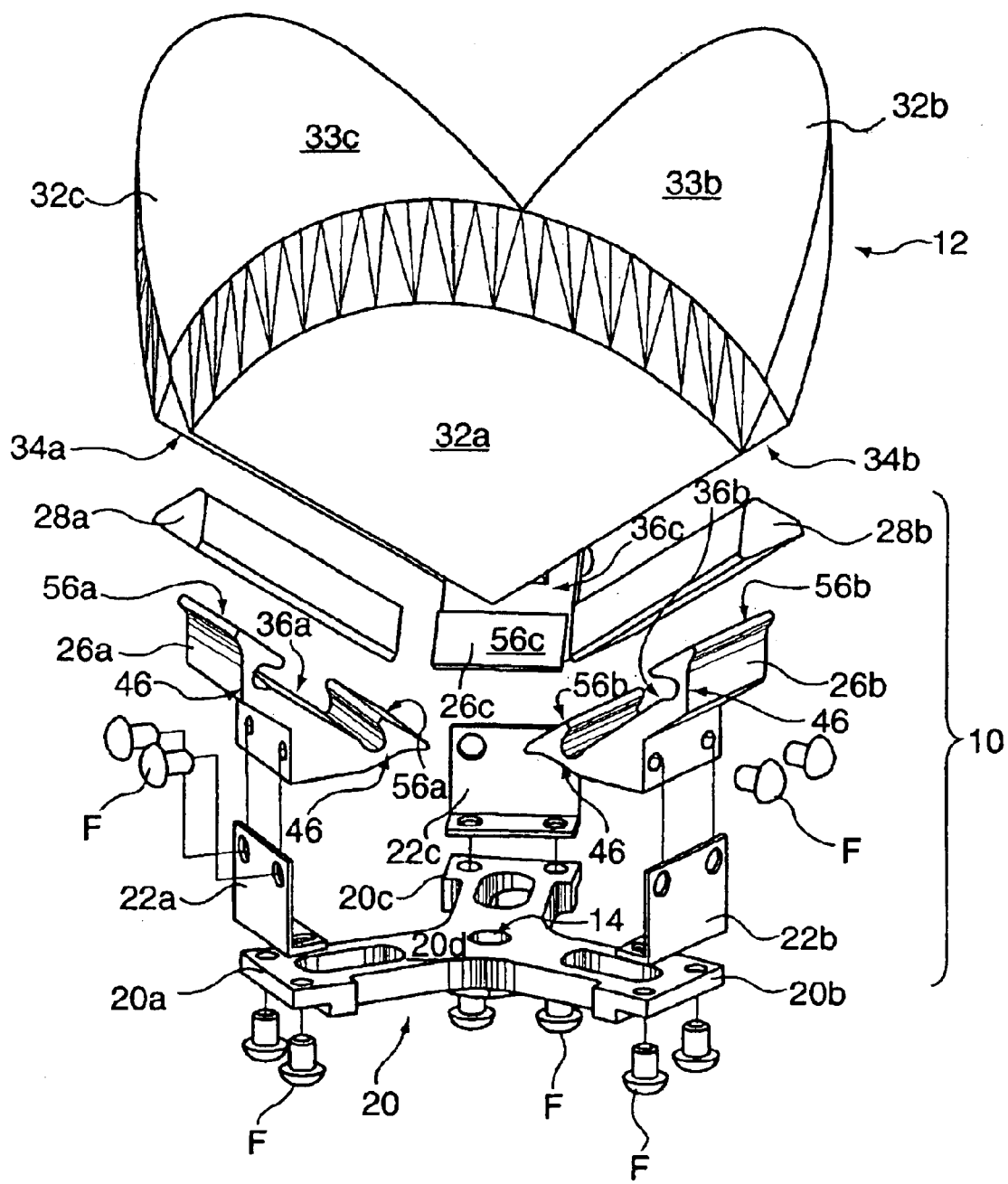
FIG. 3A is an exploded perspective view of the assembly of FIG. 1.

Referring now to FIGS. 1, 2 and 3A, retroreflector mount 10 of the invention is illustrated with a retroreflector 12 mounted thereon. Retroreflector 12 has mirror plate 32a that is perpendicularly assembled to mirror plate 32b and perpendicularly assembled to mirror plate 32c. Each of mirror plates 32a, 32b and 32c has a respective reflective surface 33a (not shown), 33b and 33c. The edges of mirror plates 32 which contact adjacent mirror plates 32 are formed to be substantially perpendicular to their respective reflective surfaces. When mutually perpendicular mirror plates 32 are assembled, a groove 34 is formed between their contacting edges, this groove 34 substantially forming a 90° enclosed angle, and represented by 34a, 34b and 34c.

In use, an incident light beam L contacts one of reflective surfaces 33a, 33b or 33c of retroreflector 12, reflects to the adjacent, substantially perpendicular reflective surfaces, and is then reflected back along a line substantially parallel to, and transversely displaced from, incident beam L. Mirror plates 32a, 32b and 32c are preferably made of quartz so as to have relatively low coefficients of thermal expansion (CTE) and to provide a substantially rigid structure. The reflective surfaces of mirror plates 32a, 32b and 32c are polished to be very flat for high accuracy reflection of beam L.

Retroreflector 12 is supported on and fixedly attached to retroreflector mount 10. In the preferred embodiment of FIGS. 1–3, mount 10 has a substantially planar base member 20 formed with a plurality of arms 20a, 20b and 20c. Arms 20a, 20b and 20c are spaced circumferentially from one another by substantially 120° angles to allow simple alignment with groves 34a, 34b and 34c, respectively.

Figure 5:
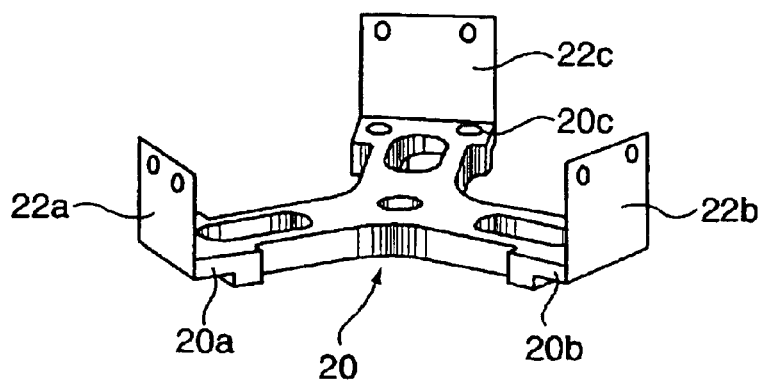
FIG. 5 is a perspective view of the base member of a sixth embodiment of the invention.

Each arm 20a, 20b and 20c is formed with a set of holes for assembly of connectors 22a, 22b and 22c, respectively. In a first embodiment, connector 22 is formed with substantially a 90° angle between a lower portion and an upper portion thereof (see FIG. 3A). In another embodiment, connector 22 is formed as an integral extension from the end of arm 20 (see FIG. 5). In either case, the upper portion of connector 22 is substantially perpendicular to a top surface 20d of base 20.

Figure 3B:
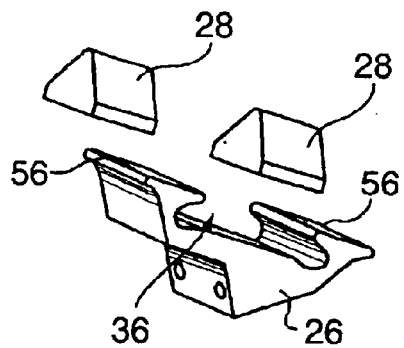
FIG. 3B is an exploded perspective view of the resilient member and blocks of a second embodiment of the invention.

Three support members 26a, 26b and 26c are assembled to the respective upper portions of connectors 22a, 22b and 22c, through use of screws F applied through holes in the upper portions of connectors 22a, 22b and 22c and corresponding holes in a lower portion of each of supports 26a, 26b and 26c, as is best shown in FIGS. 3A and 3B. Supports 26 are each formed with an elongated notch 36 having on either end thereof platforms with substantially co-planar surfaces 56a, 56b and 56c. The configuration of supports 26, and in particular the configuration of notches 36 within supports 26, allow for both strength and resiliency in supports 26, as notches 36 help to ensure that vibrational forces emanating through mount 10 from pedestal 16 (see FIG. 1), travel only as far as necks 46 of supports 26, and do not, to any significant degree, thereafter translate further up, past, and into, the platforms bearing surfaces 56. For those vibrational forces that do make it past necks 46, deflections only in the axial direction are experienced by retroreflector 12, as all radial and/or rotational deflections are prevented by the overall structure of mounting assembly 10.

Figure 3C:
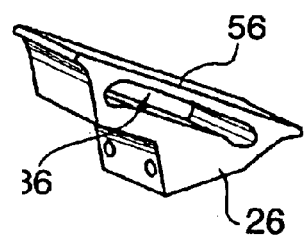
FIG. 3C is a perspective view showing the resilient member of a third embodiment of the invention.

In FIG. 3C, support members 26 are seen to be constructed having one planar surface for receipt thereon of block(s) 28, thereby clearly defining notch 36.

Blocks 28 are the next elements of mount 10. They are attached, preferably through the use of an adhesive to surfaces 56. In the preferred embodiment, they are sized to extend across notches 36 (see FIGS. 1 and 3A), but the invention also anticipates that blocks 28 can also be shorter in length, so as to be mounting pads for each individual co-planar surface 56 (see FIG. 3B). In either embodiment, blocks 28 are shaped to be received within grooves 34 of retroreflector 12. Blocks 28 are also adhered within grooves 34, thereby completing the connection of mount 10 to retroreflector 12.

Figure 4A:
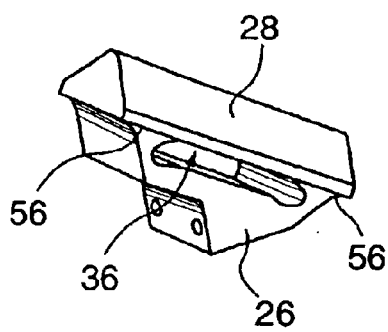
FIG. 4A is a perspective view showing the resilient member and blocks of a forth embodiment of the invention.
Figure 4B:
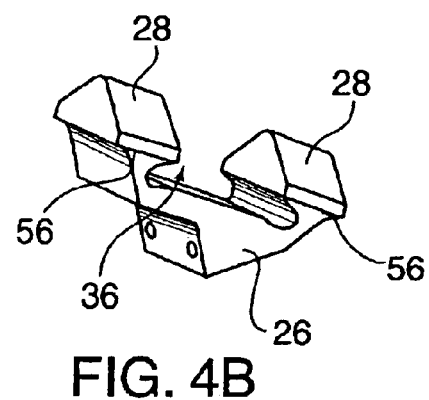
FIG. 4B is a perspective view showing the resilient member and blocks of a fifth embodiment of the invention.

As earlier indicated, the invention anticipates additional embodiments wherein blocks 28 are integrally formed with supports 26 (see FIGS. 4A and 4B). In FIG. 4A, it is seen that blocks 28 are of the same size as blocks 28 of the first embodiment shown in FIGS. 1 and 3A; i.e., blocks 28 extend across notches 36, and are therefore integral with both co-planar surfaces 56 of supports 26. Further, the invention anticipates that blocks 28 do not need to be large enough to extend across notches 36, but instead can be sized as those in the embodiment shown in FIG. 3B, and thereby simply be individual extensions of supports 26, as best shown in FIG. 4B.

The various components of retroreflector mount 10 are preferably formed of a readily machined material having a relatively low CTE, for example a steel alloy such as Invar®. Although the CTE of quartz and the CTE of Invar® are not equal, both are relatively low, and thus the relative thermal expansions of the various components of the retroreflector and the mount are minimized under normal conditions.

Finally, mount 10, has a threaded bore 14 into which a correspondingly threaded member extending from pedestal 16 can be used to secure mount 10 to pedestal 16. In like regard, mount 10 may instead have the extending (male) threaded member, while pedestal 16 has the receiving (female) threaded bore (not shown).

It will thus be seen that the objects set forth above, among those made apparent from the preceding description, are efficiently obtained, and, since certain changes may be made in the above constructions without departing from the spirit and scope of the invention, it is intended that all matter contained in the above description and shown in the accompanying drawings shall be interpreted as illustrative, and not in a limiting sense.

It is also to be understood that the following claims are intended to cover all of the generic and specific features of the invention herein described and all statements of the scope of the invention, which, as a matter of language, might be said to fall therebetween.

What is claimed is:

1. A vibration and shock absorbing mounting assembly for a retroreflector, comprising:
   a base member, used in part for securing said assembly to a supporting structure;
   a plurality of resilient support members attached to and extending from said base member along first surfaces thereof; and
   a plurality of mounting blocks, wherein at least one mounting block of said plurality of mounting blocks is attached to at least one other surface of each one of said resilient support members of said plurality of resilient support members;
   wherein said retroreflector is mounted to said mounting assembly on said plurality of mounting blocks.

2. A mounting assembly as recited in claim 1, said base member comprising a plurality of radially extending arms, each arm of said plurality of radially extending arms receiving said each one of said resilient support members, along said first surface thereof.

3. A mounting assembly as recited in claim 2, said plurality of radially extending arms comprising three radially extending arms.

4. A mounting assembly as recited in claim 2, further comprising a plurality of connector members, wherein one of said plurality of connector members is attached between said each one of said resilient support members along said first surface thereof, and said respective radially extending arm, to add further shock and vibration absorbing capacity to said mounting assembly.

5. A mounting assembly as recited in claim 1, wherein said at least one other surface of said each one of said resilient support members is a single receiving surface for receipt thereon of said at least one mounting block.

6. A mounting assembly as recited in claim 5, wherein said each one of said resilient support members has a notch defined therethrough, between said single receiving surface and said first surface, said notch allowing said resilient support member to be resilient.

7. A mounting assembly as recited in claim 1, wherein said at least one other surface of said each one of said resilient support members is a pair of coplanar receiving surfaces.

8. A mounting assembly as recited in claim 7, wherein said at least one mounting block, is two mounting blocks, one for each of said co-planar receiving surfaces.

9. A mounting assembly as recited in claim 8, said each one of said resilient support members further comprising a notch defined substantially under and extending between said pair of co-planar receiving surfaces and further between said co-planar receiving surfaces and said first surface, said notch allowing said resilient support member to be resilient.

10. A mounting assembly as recited in claim 7, wherein said at least one mounting block, is one mounting block to be mounted on said pair of co-planar receiving surfaces.

11. A mounting assembly as recited in claim 10, said each one of said resilient support members further comprising a notch defined substantially under and extending between said pair of co-planar receiving surfaces, substantially under said one mounting block, and further between said co-planar receiving surfaces and said first surface, said notch allowing said resilient support member to be resilient.

12. A vibration and shock absorbing mounting assembly for a retroreflector, comprising:
   a base member, used in part for securing said assembly to a supporting structure; and
   a plurality of resilient support members attached to and extending from said base member along first surfaces thereof, each one of said resilient support members of said plurality of resilient support members having integrally formed therewith and extending from at least one other surface thereof, at least one mounting block for partial receipt thereon of a portion of said retroreflector.

13. A mounting assembly as recited in claim 12, said base member comprising a plurality of radially extending arms, each arm of said plurality of radially extending arms receiving said each one of said resilient support members, along said first surface thereof.

14. A mounting assembly as recited in claim 13, said plurality of radially extending arms comprising three radially extending arms.

15. A mounting assembly as recited in claim 13, further comprising a plurality of connector members, wherein one of said plurality of connector members is attached between said each one of said resilient support members along said first surfaces thereof, and said respective radially extending arm, to add further shock and vibration absorbing capacity to said mounting assembly.

16. A mounting assembly as recited in claim 12, wherein said at least one other surface of said each one of said resilient support members is a single receiving surface for integral formation therefrom of said at least one mounting block.

17. A mounting assembly as recited in claim 16, wherein said each one of said resilient support members has a notch defined therethrough, between said single receiving surface and said first surface, said notch allowing said resilient support member to be resilient.

18. A mounting assembly as recited in claim 12, wherein said at least one other surface of said each one of said resilient support members is a pair of co-planar receiving surfaces.

19. A mounting assembly as recited in claim 18, wherein said at least one mounting block, is two mounting blocks, one for each of said co-planar receiving surfaces.

20. A mounting assembly as recited in claim 19, said each one of said resilient support members further comprising a notch defined substantially under and extending between said pair of co-planar receiving surfaces and further between said co-planar receiving surfaces and said first surface, said notch allowing said resilient support member to be resilient.

21. A mounting assembly as recited in claim 18, wherein said at least one mounting block, is one mounting block to be mounted on said pair of co-planar receiving surfaces.

22. A mounting assembly as recited in claim 21, said each one of said resilient support members further comprising a notch defined substantially under and extending between said pair of co-planar receiving surfaces, substantially under said one mounting block, and further between said co-planar receiving surfaces and said first surface, said notch allowing said resilient support member to be resilient.

23. A mounting assembly for a retroreflector that allows for axial movement of said retroreflector, while significantly reducing rotational and radial movement thereof, comprising:
a base member, used in part for securing said assembly to a supporting structure;
a plurality of axially resilient support members attached to and extending from said base member along first surfaces thereof; and
a plurality of mounting blocks, wherein at least one mounting block of said plurality of mounting blocks is attached to at least one other surface of each one of said axially resilient support members of said plurality of axially resilient support members;
wherein said retroreflector is mounted to said mounting assembly on said plurality of mounting blocks.

24. A mounting assembly as recited in claim 23, said base member comprising a plurality of radially extending arms, each arm of said plurality of radially extending arms receiving said each one of said axially resilient support members, along said first surface thereof.

25. A mounting assembly as recited in claim 24, said plurality of radially extending arms comprising three radially extending arms.

26. A mounting assembly as recited in claim 24, further comprising a plurality of connector members, wherein one of said plurality of connector members is attached between said each one of said axially resilient support members along said first surface thereof, and said respective radially extending arm, to add further shock and vibration absorbing capacity to said mounting assembly.

27. A mounting assembly as recited in claim 23, wherein said at least one other surface of said each one of said axially resilient support members is a single receiving surface for receipt thereon of said at least one mounting block.

28. A mounting assembly as recited in claim 27, wherein said each one of said axially resilient support members has a notch defined therethrough, between said single receiving surface and said first surface, said notch allowing said axially resilient support member to be axially resilient.

29. A mounting assembly as recited in claim 23, wherein said at least one other surface of said each one of said axially resilient support members is a pair of co-planar receiving surfaces.

30. A mounting assembly as recited in claim 29, wherein said at least one mounting block, is two mounting blocks, one for each of said co-planar receiving surfaces.

31. A mounting assembly as recited in claim 30, said each one of said axially resilient support members further comprising a notch defined substantially under and extending between said pair of co-planar receiving surfaces and further between said co-planar receiving surfaces and said first surface, said notch allowing said axially resilient support member to be axially resilient.

32. A mounting assembly as recited in claim 29, wherein said at least one mounting block, is one mounting block to be mounted on said pair of co-planar receiving surfaces.

33. A mounting assembly as recited in claim 32, said each one of said axially resilient support members further comprising a notch defined substantially under and extending between said pair of co-planar receiving surfaces, substantially under said one mounting block, and further between said co-planar receiving surfaces and said first surface, said notch allowing said axially resilient support member to be axially resilient.

* * * * *